Patented Apr. 19, 1938

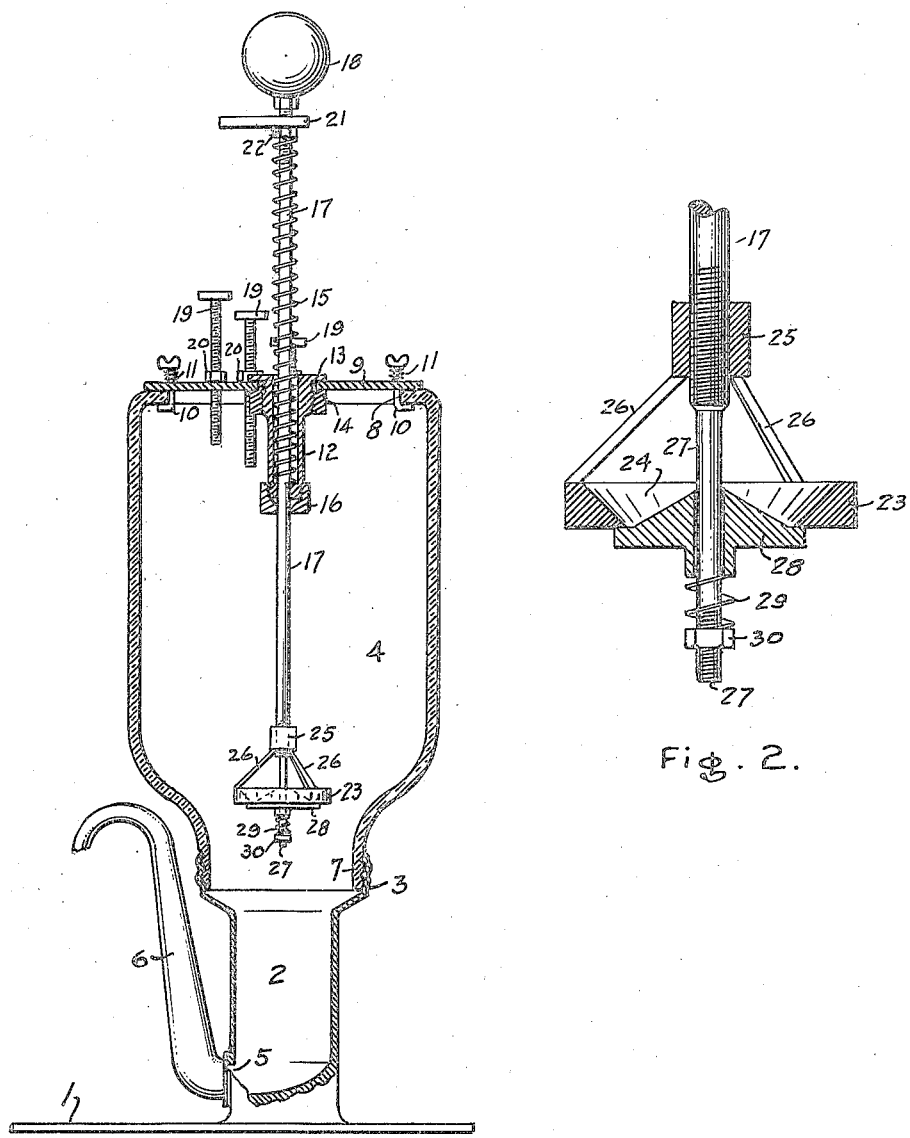

2,114,699

UNITED STATES PATENT OFFICE 2,114,699

FOOD DISPENSER

John M. Boehmer, Tacoma, Wash.

Application October 13, 1936, Serial No. 105,381

5 Claims. (Cl. 221—102)

This invention relates to devices for exhibiting and dispensing foods and especially to such apparatus as is adapted to handle mayonnaise or other dressings, and similar semi-fluid materials.

The objects of my invention are to provide, first, an apparatus of which every portion is removable and easily cleaned, thus insuring its sanitary condition at all times; second, an apparatus which includes a glass container, whereby the customer may see the dressing being purchased; third, an apparatus in which the dressing is kept without undue exposure to the air; fourth, an apparatus whereby a single motion of the manually-operated piston will deliver the required quantity of the dressing; fifth, an apparatus which is always ready for use; sixth, an improved form of valved piston; and seventh, an apparatus which is simple to make, easy to operate, and effective and accurate in use.

I attain these and other objects by the devices, mechanisms, and arrangements illustrated in the accompanying drawing, in which—

Fig. 1 is a vertical section of my improved food dispenser; and

Fig. 2 is an enlarged section of the valved piston.

Similar numerals of reference refer to similar parts throughout the several views.

My apparatus comprises a base having a dispensing or delivery spout attached thereto; an open-ended container supported by said base; a closure plate for the container; and a manually-operated spring-resisted valved piston supported by said closure.

The base comprises a supporting plate 1 adapted to rest on a suitable counter or other support, and having a cylindrical chamber 2 extending vertically upward therefrom. The upper end of the cylinder 2 is enlarged and screw-threaded at 3 to receive the lower open end of the glass container 4. The lower end of the cylinder 2 is provided with a side opening 5 connecting with a spout 6, attached to the cylinder 2 by suitable means, and leading up to a point convenient for the delivery of the dressing into a suitable container.

The glass container 4 is provided at its lower end with a screw-threaded neck or opening 7, adapted to screw into the enlargement 3 of the cylinder 2, whereby the container is supported. The upper end of the container 4 is provided with a large circular opening 8.

A closure plate 9 is removably mounted on the upper end of the glass container 4 and completely closes the opening 8 thereof. This plate 9 is held in proper position thereon by means of the plurality of hooks 10, each of which is mounted in the plate 9 and extends into the container 4 and is provided with a spring 11. These hooks 10 engage the edge of the hole 8 and are turnable in the plate 9 to permit its hooked portion to engage the inside surface of the container 4 to hold the plate 9 thereto.

The plate 9 is provided with a central opening through which the guide sleeve passes. This guide sleeve comprises a cylinder 12 adapted to pass centrally through the central opening in the plate 9 and provided with a flange 13 of greater diameter than the said opening. The cylinder 12 is provided with a screw-threaded portion adjacent to the said flange 13 and on which the clamp nut 14 is screwed to clamp the plate 9 between it and the flange 13. The lower end of the cylinder 12 is provided with a concentric hole of smaller diameter than the inside of the cylinder 12, thereby providing a shoulder against which the compression spring 15 is seated. A stuffing box 16 is screwed on the lower end of the cylinder 12.

The actuating rod 17 passes freely through the hole in the bottom of the cylinder and through the stuffing box 16, and is provided, at its upper end with a suitable handle or ball 18, whereby it is actuated. A series of adjustable stops 19 are screwed in the plate 9 at points equidistant from the center of the rod 17 and are held in adjusted positions by the several lock nuts 20. An arm 21 is screwed on the upper end of the rod 17 and is locked in adjusted position, vertically, by the lock nut 22. Since the rod 17 may turn freely in the cylinder 12 and stuffing box 16, as well as move vertically therein, it is evident that the arm 21 may be turned to engage any one of the stops 19, whereby the downward motion of the rod 17 is accordingly limited. The spring 15 is compressed between the arm 21 and the bottom of the cylinder 12.

The lower end of the rod is provided with the valved piston, particularly illustrated in Fig. 2. This comprises an annular piston body 23 having its inner surface 24 beveled as shown, and secured to the hub 25 by spider arms 26. The diameter of the piston body 23 is such as to fit neatly in the cylinder 2. The hub 25 is screwed on the rod 17, and this rod 17 has an extension 27, preferably of smaller diameter, extending down below the hub 25. A valve body 28 is slidably mounted on the extension 27, below the piston 23 and closes the hole in the said annular piston body, and is pressed against the lower surface thereof by the spring 29 which is adjustably supported below the valve body 28, by the nut 30 screwed on said extension 27. The upper surface of the valve 28 is preferably formed in conical shape as shown.

Thus it will be seen that the piston is normally raised out of the cylinder 2 and that the mayonnaise in the container also fills the neck 7 and the cylinder 2. Mayonnaise, being only semifluid, will not flow out of the spout 6 under ordinary conditions, but should it tend to drip therefrom, the said spout may be closed by a cork or other closure cap. As soon as the ball 18 is pressed down, the piston 23 forces the valve 28 up the extension 27 to completely close the piston, and as soon as the piston enters the cylinder 2 it forces the mayonnaise out therefrom through the spout 6 until the arm 21 meets one of the stops 19, thus delivering a measured quantity of the mayonnaise to the purchaser. Upon the release of the ball 18, the spring 15 retracts the piston 23 and the weight of the contents of the jar 4 opens the valve 28 to permit the mayonnaise to flow through the piston into the cylinder 2.

It is, of course, understood that many variations of the construction shown and described may be made without departing from the spirit of my invention as outlined in the appended claims.

Having therefore described my invention, what I claim and desire to secure by Letters Patent, is:—

1. A food dispenser comprising a supported vertical cylinder, open at its upper end and having a delivery spout extending from its lower end; an open-ended container supported by and above said cylinder and in open communication therewith; a closure plate secured to said container and closing the open end thereof; an actuating rod passing through said plate and guided thereby; and a valved piston mounted on said rod and adapted, on its downward stroke, to enter said cylinder and to eject the food therein therefrom through said spout.

2. A food dispenser comprising a supported vertical cylinder, open at its upper end and having a delivery spout extending from its lower end; an open-ended container supported by and above said cylinder and in open communication therewith; a closure plate secured to said container and closing the open end thereof; an actuating rod passing through said plate and guided thereby; a valved piston mounted on said rod and adapted, on its downward stroke, to enter said cylinder and to eject the food therein therefrom through said spout; and a spring engaging said rod and adapted to oppose its actuated downward motion and to retract the said piston from said cylinder when the actuating force is withdrawn.

3. A food dispenser comprising a supported vertical cylinder, open at its upper end and having a delivery spout extending from its lower end; an open-ended container supported by and above said cylinder and in open communication therewith; a closure plate secured to said container and closing the open end thereof; an actuating rod passing through said plate and guided thereby; a valved piston mounted on said rod and adapted, on its downward stroke, to enter said cylinder and to eject the food therein therefrom through said spout; a spring engaging said rod and adapted to oppose its actuated downward motion and to retract the said piston from said cylinder when the actuating force is withdrawn; an arm mounted on said rod; and a plurality of separately adjustable stops mounted in said plate and equidistant from said rod whereby, when said rod is actuated and turned to selected position, the corresponding stop will be engaged by said arm to limit the downward motion of said rod and piston.

4. In an ejecting means for a food dispenser, an actuated rod; a boss secured thereto; an annular piston connected to said boss by means of spider arms; an axial extension to said rod below said boss; a valve member below said piston and mounted on and sliding freely on said extension, said valve member normally closing the opening of said annular piston; an adjustable nut on the end of said extension; and a spring between said nut and said valve member whereby the valve member is pressed upward to close the opening in said piston.

5. In an ejecting means as set forth in claim 4, wherein the inner surface of said annular piston is beveled and wherein the upper surface of said valve member is conical.

JOHN M. BOEHMER.